INVENTORS
ROBERTS KITCHENER LYNES
JOHN MARDEN WILLIS
JOHN WILLIAM TAYLOR

May 12, 1970 R. K. LYNES ET AL 3,511,946
FLUID POWERED TIMING DEVICE
Filed April 28, 1967 3 Sheets-Sheet 2

INVENTORS
ROBERTS KITCHENER LYNES
JOHN MARDEN WILLIS
JOHN WILLIAM TAYLOR

United States Patent Office 3,511,946
Patented May 12, 1970

3,511,946
FLUID POWERED TIMING DEVICE
Roberts Kitchener Lynes, Moseley, Birmingham, John Marden Willis, Clent, and John William Taylor, Acocks Green, Birmingham, England, assignors to Roberts Kitchener Lynes and Bullfinch (Gas Equipment) Limited, Birmingham, England
Filed Apr. 28, 1967, Ser. No. 634,589
Claims priority, application Great Britain, May 7, 1966, 20,323/66
Int. Cl. H01h 7/08, 43/22
U.S. Cl. 200—35         14 Claims

ABSTRACT OF THE DISCLOSURE

A timing device comprising a diaphragm for connection to a source of pulsating fluid pressure so that diaphragm movement drives a one-way drive mechanism controlling switch means.

---

This invention relates to a fluid powered timing device and has for its object a timing device operated by pressure impulses in a pressure varying fluid source to give electric signals in timed relationship with the pressure impulses. A further object of the invention is the provision of a timing device wherein the time relationship between the electric signals and the pressure impulses can be readily varied so that, for example, given a constant pressure impulse frequency, the electric signals can be generated at a selected steady frequency.

In accordance with the invention a timing device for connection to a source of fluid pressure impulses is characterised by a diaphragm adapted for connection to the pressure impulse source so that the diaphragm responds to the pressure impulses, a one-way drive mechanism connected to the diaphragm to produce a rotary stepping movement in timed relationship with the pressure impulse response of the diaphragm, and switch means connected to the one-way drive mechanism so as to be actuated by the rotary movement of the latter.

A typical embodiment of the invention is described, by way of example only, with reference to the accompanying drawings, wherein.

Figure 1:
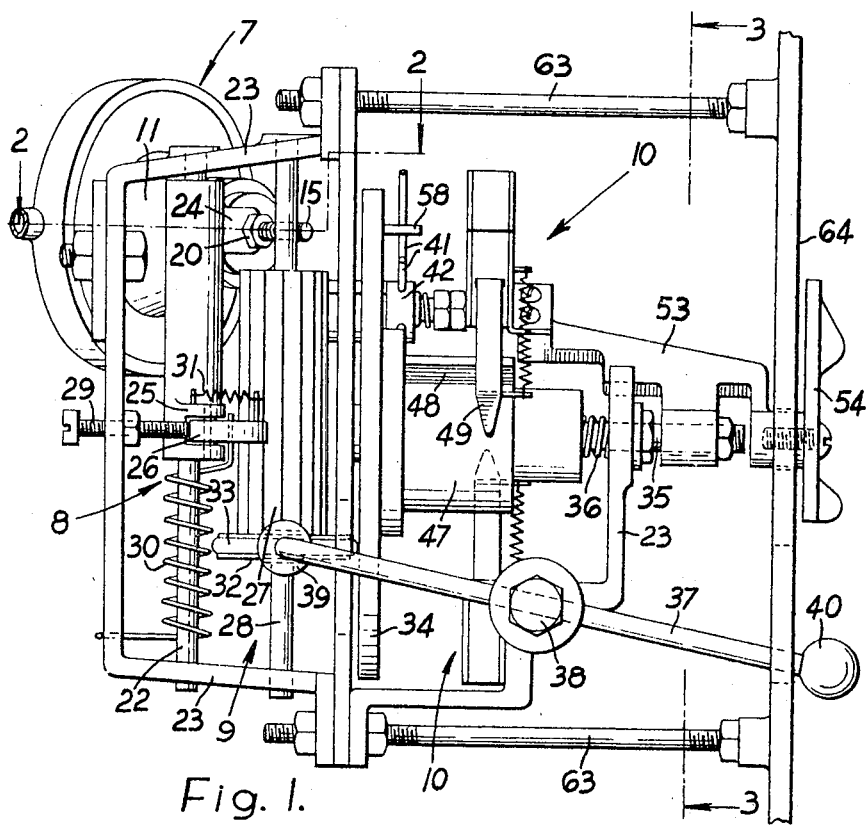
FIG. 1 is a side elevation of a timing device according to the invention.

The timing device shown in the drawings generally comprises an operating unit 7, a ratchet and pawl assembly 8, a variable gear assembly 9, and a switch assembly 10.

Figure 2:
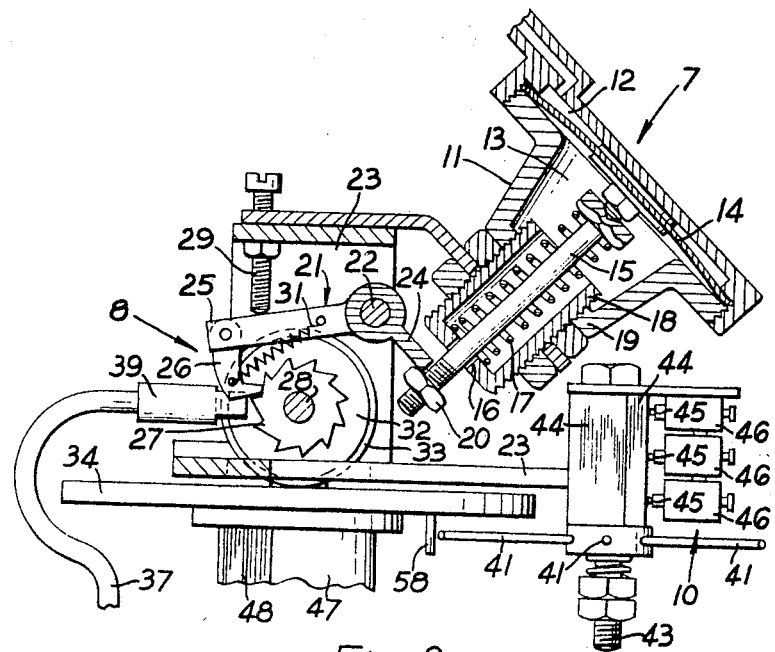
FIG. 2 is a section on the line 2—2 of FIG. 1.
Figure 3:
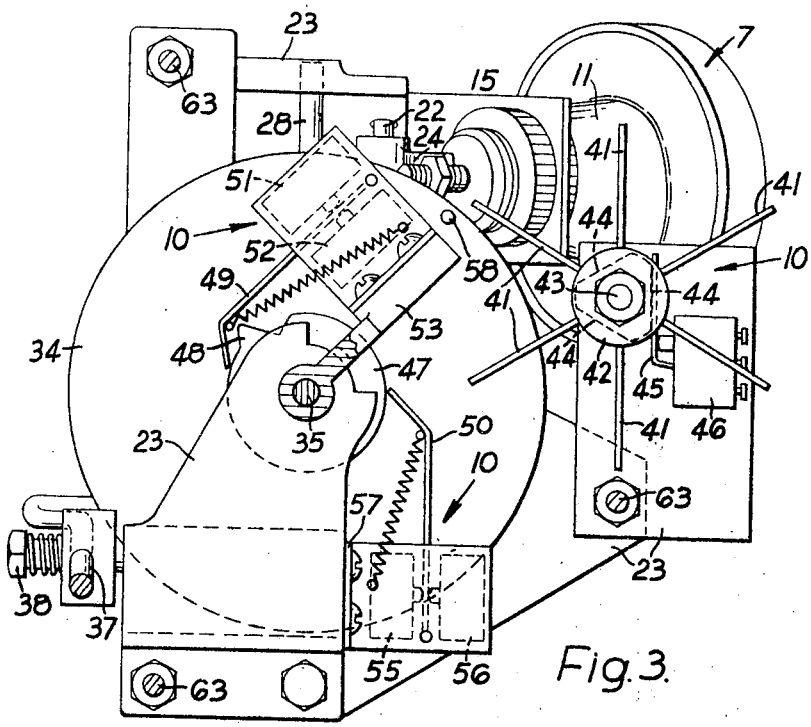
FIG. 3 is a section on the line 3—3 of FIG. 4.
Figure 4:
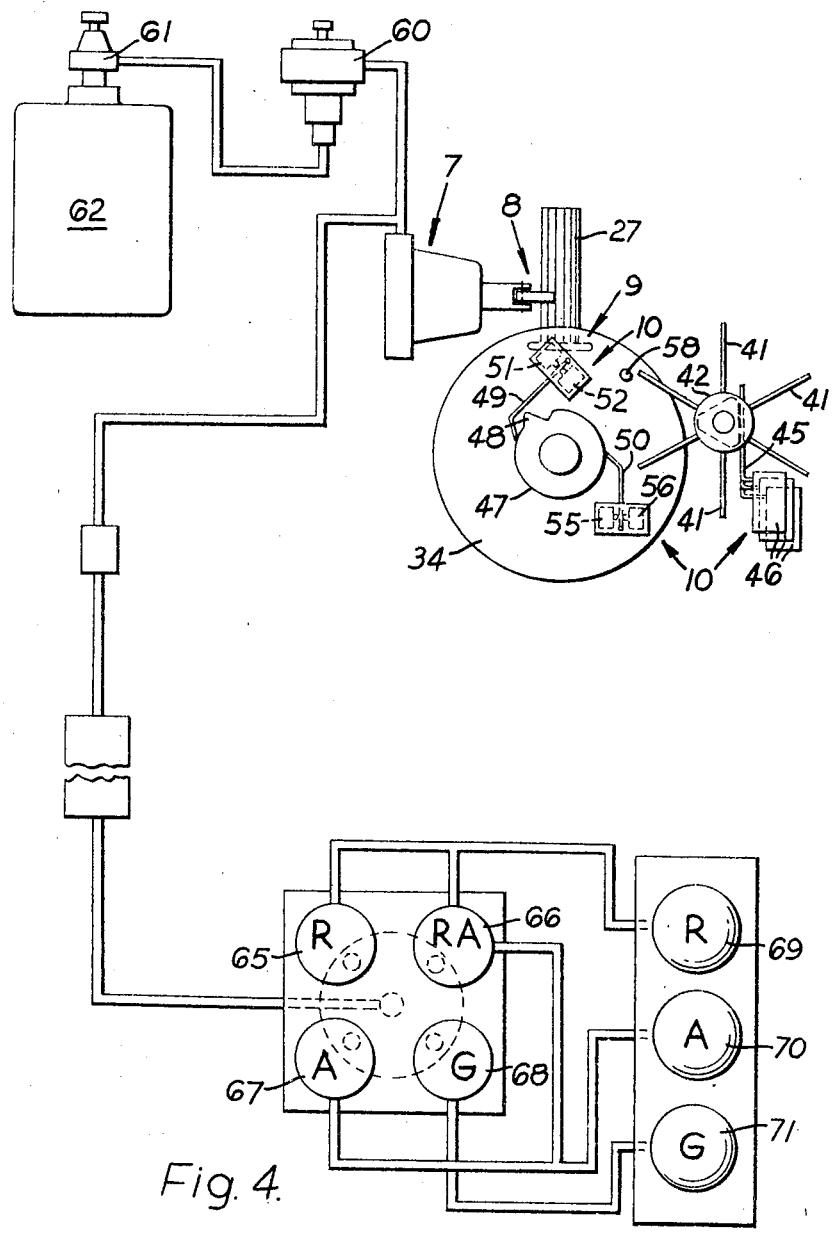
FIG. 4 is a schematic drawing illustrating the connection of the timing device of FIG. 1 to a fluid gas pressure impulse source to control the operation of a plurality of gas valves.

The operating unit 7 (see especially FIG. 2) comprises a three-part body 11 having first and second chambers 12 and 13 separated by a flexible diaphragm 14. The first chamber 12 is connected in a gas flow line to a source of pulsating gas pressure so that low to high pressure variations at the source and a spring resistance 17 effective during high to low pressure variations, respectively produce movements of the centre of the diaphragm 14 in the opposite directions. Secured to the center of the diaphragm 14 is a rod 15 extending through a guide aperture 16 in the body so as to undergo reciprocation with opposite movements of the diaphragm. A sleeve 18 forming a part of the body 11 has screw engagement with the adjoining part 19 of the body defining the second chamber 13. Screw adjustment of sleeve 18 with respect to the body part 19 serves to adjust the effective thrust of the spring 17 and hence the fluid pressure levels at which the diaphragm 14 and rod 15 move. Externally of the body 11 a screw threaded part of the rod 15 adjustably carries a nut 20 to couple the operating unit 7 to the ratchet and pawl assembly 8.

The ratchet and pawl assembly 8 comprises a lever 21 fulcrumed on a shaft 22 fixed to the stationary frame 23 which frame also carries the stationary parts of the operating unit 7. One arm 24 of the lever is arranged to be actuated by movement of the nut 20 with the rod 15, whereas the other lever arm 25 carries a pawl 26 engaging with an axially elongated ratchet wheel 27 freely mounted for both rotation and axial movement on a shaft 28 fixed at 29 in the frame 23. Thus the ratchet wheel 27 is turned through a given angle each time the rod 15 is moved by the spring 17 consequent upon a drop in the fluid pressure. An adjusting screw 29 mounted in the frame 23 controls the stroke of the pawl, a helical torsion spring 30 mounted about the shaft 22 and connected between the frame 23 and the lever arm 25 urges the latter against the rod nut 20 and produces return movement of the pawl 26 consequent upon increase in fluid pressure, and a tension spring 31 connected between the lever arm 25 and pawl 26 urges the latter to engage the ratchet wheel 27.

The ratchet wheel 27 is integrally connected at its lower end to the driving wheel 32 of the variable gear assembly 9. The wheel 32 has a friction tyre 33 which bears upon the roughly cast surface of a driven disc 34 rotatably mounted on a fixed shaft 35 mounted in the frame 23. A thrust spring 36 also mounted on the shaft 35 displaces the disc axially towards the wheel 32 to produce a friction driving connection therebetween. A gear lever 37 is fulcrumed at 38 on the frame 23 and a bifurcated end 39 of one arm of the lever 37 embraces the thickness of the wheel 32 so that manual movement of a knob 40 on the other lever arm serves to move the wheel 32 radially across the face of the disc 34 thereby to provide an infinitely variable gear ratio drive between the limits of the available axial movement of the wheel. Hence the angular displacement of the disc 34 produced by a given ratcheted angular displacement of the tyred wheel 32 can be continuously varied between the wide limits. A striker pin 58 on the disc 34 couples the variable gear assembly to a first part of the switching assembly 10 once during each revolution of the disc.

The first part of the switching assembly comprises a plurality of radial arms 41 on a cam sleeve 42 freely rotatably mounted on a fixed shaft 43 mounted on the frame 23. A plurality of adjoining pairs of cam faces 44 at different radii on the cam sleeve 42 co-operate with pivoted switch actuating arms 45 to actuate respective micro-switches 46.

In the illustrated embodiment the variable gear assembly is also adapted to operate a second part of the switch assembly. More specifically a cam wheel 47 integral with the disc 34 has a cam lobe 48 co-operating with two circumferentially spaced switch operating levers 49 and 50. The switch arm 49 is pivotally mounted between a first pair of opposed micro-switches 51 and 52 carried by a bracket 53 rotatably mounted on the shaft 35. A finger piece 54 serves to permit angular adjustment of the bracket 53 together with the switches 51 and 52 and hence permits adjustment of the instants during each revolution of the disc 34 at which the cam lobe 48 successively displaces the switch arm 49 in opposite directions to actuate the micro-switches 51 and 52. The switch arm 50 is pivotally mounted between a second pair of opposed micro-switches 55 and 56 mounted on a stationary bracket 7 fixed to the frame 23. Thus these switches are successively actuated at fixed times during each revolution of the disc 34.

The frame 23 is mounted by rods 63 behind a face plate 64 which can be calibrated to assist the manual setting of the controls 40 and 54.

In operation a source of gas pressure impulses of constant frequency, constituted for example by the provision of an impulse generating valve 60 in a gas flow line from a reducing valve 61 of a pressure liquified paraffin hydrocarbon gas container 62 is connected to the first chamber of the operating unit 7 thereby causing reciprocation of the rod 15 at the same frequency as the gas impulses. Each reciprocation of the rod 15 imparts a given angular stepping movement to the ratchet and pawl assembly which in turn imparts an angular stepping movement to the disc 34 by an amount dependant upon radial setting of the tyred wheel 32 of the variable gear assembly 9 as selected by the lever 37. Once during each revolution of the disc 34 the striker pin 58 angularly displaces a radial arm 41 by an amount equal to the angle between adjacent arms thereby to change over the condition of the micro-switches 46. Also once during each revolution of the disc 34 the two pairs of micro-switches 51, 52 and 55, 56 are actuated, the first pair 51, 52 at successive instants which can be varied by the setting of the finger piece 54. Thus given pressure impulses at a constant frequency the various switches 46, 51 and 52, 55, 56 can be employed to control electric circuits to produce circuit changes at a constant frequency selected by the setting of the lever 37, and in the case of the switches 51 and 52 in selected phase relationship with the operations of the switches 46 and 55, 56 as determined by the setting of the finger piece 54.

In one example of a practical application of the above described timing device the micro-switches of the device are employed to control four gas valves 65, 66, 67 and 68 in a smoothed and reduced pressure gas flow line between the output of the pulse generating valve 60 and an array of three gas burning lamps 69, 70 and 71 together constituting a conventional red, amber and green traffic light. In this example the lever 37 of the timing device can be employed to control the cycling time of the traffic light, and the control 54 can be employed to control the red signal overlap between the cycles of operation of this traffic light and another traffic light controlled by the same timing device. A suitable gas valve for this purpose is described and claimed in our pending application Ser. No. 633,051, filed Apr. 24, 1967 and a suitable pulse generating valve and complete traffic light system is described and claimed in our co-pending application Ser. No. 634,767, filed Apr. 28, 1967.

We claim:

1. A fluid pressure actuated timing device comprising a fluid pressure responsive element, means for connecting said element to be moved in respose to periodic impulses from a fluid pressure impulse source, electric switch means, and mechanism providing a unidirectional stepped drive connection between said element and said switch means, said mechanism comprising a variable ratio gear assembly affording means for adjustment of the period of operation of said switch means in relation to the frequency of the pressure impulses.

2. In the timing device defined in claim 1, said switch means comprising a rotatable switch actuating member and said drive connection comprising a one way drive mechanism actuated from said element and connected to impart rotary stepped movement to said rotatable switch actuating member.

3. In the timing device defined in claim 2, said mechanism comprising a pawl driven from said element and a ratchet wheel having a driving connection with said rotatable switch actuating member.

4. In the timing devices defined in claim 3, said pawl being mounted on a rocker arm operatively connected to said element, and said drive connection comprising a drive wheel rotatable with said ratchet wheel and peripherally engaged with the face of a driven wheel connected to said rotatable switch actuating member.

5. In the timing device defined in claim 4, means for adjustably varying the stroke of said rocker arm.

6. In the timing device defined in claim 4, said adjustment of said period of operation of the switch means comprising manual means for adjusting said drive wheel radially of said driven wheel face.

7. In the timing device defined in claim 6, said ratchet wheel being elongated longitudinally to retain operative engagement with said pawl during said adjustment of the drive wheel.

8. In the timing device defined in claim 4, said switch means comprising cam means rotatable with said driven wheel and at least one relatively stationary switch unit actuated by said cam means.

9. In the timing device defined in claim 8, means for adjusting said switch unit about the axis of said driven wheel for varying the time of switch actuation during rotation of said driven wheel.

10. In the timing device defined in claim 4, said switch means comprises a bank of relatively stationary switch units selectively actuated by means rotatable with said driven wheel.

11. In the timing device defined in claim 1, resilient means biasing said element in a direction opposite to said fluid pressure impulses, and means for adjusting said resilient means to vary the fluid pressure levels effecting movement of said element.

12. In the timing device defined in claim 4, said element being a flexible diaphragm moved in one direction by said fluid pressure impulses and spring biased in the other direction, and a stem fixed to said diaphragm having a one-way drive connection to said rocker arm.

13. An infinitely variable stepping gear device, especially for converting fluid pressure impulses of fixed frequency into electrical output signals of infinitely variable frequency, comprising a movable driving member actuated by fluid pressure impulses, a restoring spring connected to said driving member, a stepping device comprising a pawl and a ratchet wheel connected to be actuated by said driving member, an infinitely variable friction gear assembly comprising driving and driven wheels rotatable about axes disposed at right angles to each other with the periphery of one wheel drivingly engaged with an axial face on the other wheel, means mounting said ratchet wheel for common rotation with the driving wheel of said infinitely variable friction gear assembly, and means operatively connecting said driven wheel to electrical switch means.

14. In the device defined in claim 13, said one wheel being the driving wheel and means mounting said ratchet wheel and said driving wheel for movement together in the direction of their axis and substantially radially of the axial driven friction gear face peripherally engaged by said driving wheel.

References Cited

UNITED STATES PATENTS 2,491,361  12/1949  Burdick _____ 60—57
2,718,878  9/1955   Du Bois _____ 60—57

HERMAN O. JONES, Primary Examiner

U.S. Cl. X.R.

60—57